US006931460B2

(12) United States Patent
Barrett

(10) Patent No.: US 6,931,460 B2
(45) Date of Patent: Aug. 16, 2005

(54) DYNAMICALLY SELF-ADJUSTING POLLING MECHANISM

(75) Inventor: David Michael Barrett, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 91 days.

(21) Appl. No.: 10/440,681

(22) Filed: May 19, 2003

(65) Prior Publication Data

US 2004/0236880 A1 Nov. 25, 2004

(51) Int. Cl.[7] .............................. G06F 3/00; G06F 3/06

(52) U.S. Cl. ............................ 710/57; 710/53; 710/52; 710/5; 710/6

(58) Field of Search ........................... 710/46, 5, 6, 15, 710/19, 52, 56, 57, 53; 370/449

(56) References Cited

U.S. PATENT DOCUMENTS 4,598,363 A * 7/1986 Clark et al. .................. 710/46
5,566,351 A * 10/1996 Crittenden et al. ........... 710/46
6,049,549 A * 4/2000 Ganz et al. ................. 370/449
6,449,663 B1 * 9/2002 Carney et al. ................ 710/15
6,467,011 B2 * 10/2002 Scardamalia et al. ......... 710/65
6,621,827 B1 * 9/2003 Rezvani et al. ............. 370/449
6,640,268 B1 * 10/2003 Kumar ........................ 710/46

* cited by examiner

*Primary Examiner*—Jeffrey Gaffin
*Assistant Examiner*—Joshua D Schneider
(74) *Attorney, Agent, or Firm*—Morrison & Foerster LLP

(57) ABSTRACT

A system and method is disclosed for preventing the loss of event messages due to message buffer overruns. A fixed vendor-specific buffer pool is loaded with log messages by firmware in an adapter. A service application periodically polls a device driver for messages in the buffer pool. The device driver responds with the number of messages stored in the buffer pool and the total number of buffers in the buffer pool. The service application then issues "get next message" requests to receive the stored messages. Once the buffer pool has been emptied, the service application writes the messages to a disk file. The service application then computes a percent utilization of the buffer pool, and if the percent utilization exceeds a predetermined threshold, an algorithm is employed for increasing the polling frequency. If the percent utilization is below the threshold, an algorithm is employed for decreasing the polling frequency.

39 Claims, 1 Drawing Sheet

DYNAMICALLY SELF-ADJUSTING POLLING MECHANISM

BACKGROUND OF THE INVENTION

1. Field of the Invention

The present invention relates, generally, to the logging of messages from an adapter card in a host computer and, in one embodiment, to a system and method for dynamically adjusting the rate of message buffer processing in response to message buffer consumption to reduce the probability of message buffer overruns, while at the same time preserving memory and lowering processor utilization.

2. Description of Related Art

Host bus adapters (HBAs) are input/output (I/O) adapters that connect a host computer's bus and an outside network such as a Fibre Channel loop. HBAs manage the transfer of information between the bus and the outside network. HBAs are typically implemented in circuit cards that can be plugged into the backplane of the host computer. For example, a HBA can be inserted into a connector which interfaces to the Peripheral Component Interconnect (PCI) bus of a host computer to enable the host computer to communicate with a storage area network (SAN) using, for example, fibre channel or Internet Small Computer System Interface (iSCSI) protocols.

During the course of HBA operation, status, debug, error or other types of messages may be generated by firmware in the HBA. For example, status messages may be generated when its state changes, or a sequence of detailed debug messages may be generated as the firmware attempts to connect to a target device. Each step of the connection process can be monitored if the firmware is configured for that type of message logging. Error messages may also be generated when a connection to a storage device has failed or has terminated unexpectedly.

It is often beneficial for the host computer to log (store) these messages for subsequent troubleshooting, for example. Thus, some HBAs provide a message logging capability for storing certain messages at the host computer. Without this capability, messages generated in the HBA could not be stored in the host computer disk file for subsequent retrieval by an operator. The number of messages logged by the host computer depends on a predetermined logging level. In other words, although many messages may be generated by the HBA, only certain types of messages are typically logged.

Although in theory all messages generated by the HBA could be logged, in practice this is not the case. Restrictions on message logging may be imposed by the operating system of the host computer. For example, Microsoft's Windows® operating system provides a system event log for logging messages from a mini-port driver for an adapter card, but Microsoft only provides for the logging of a prescribed set of events (messages) that affect the host computer. The Windows system event log records events that are of interest to the Windows® Operating System, such as the successful startup of a driver, the failure of a driver to start, or a fatal condition encountered by a driver. However, Microsoft does not provide for the logging of vendor-specific events (i.e. events specific to a HBA card).

In computers employing a system event log, when the driver for a HBA recognizes an event that can be logged, the driver makes a call to the operating system (OS), telling the OS to log the message for the driver. The messages must correspond to a predefined event number assigned by Microsoft. The OS writes the messages to a disk file at its convenience, because these messages are often created during startup when the disk drive may not be available (i.e., still spinning up to speed).

Another message logging restriction imposed by the operating system is related to the allocation of memory for storing messages. For example, Microsoft's Windows® operating system only allows a device driver to allocate memory for itself at system startup. At that time, the device driver must estimate or otherwise request a memory allocation, and thereafter is stuck with this initial allocation. Microsoft also discourages developers of device drivers not to waste memory by allocating too much memory at startup. With the memory size restricted, if the HBA attempts to log too many messages, buffer overruns will occur and messages will be lost.

Thus, a need exists for a system which is able to efficiently log messages from a HBA and minimize the number of messages lost, while avoiding the limitations imposed by operating systems such as Microsoft's Windows® operating system.

SUMMARY OF THE INVENTION

Embodiments of the present invention are directed to a system and method for efficiently log messages from a circuit card such as a HBA to a host computer which minimizes the number of messages lost while preserving system bandwidth to the maximum extent possible by avoiding unnecessary polling. In particular, embodiments of the present invention help to prevent the loss of event messages due to message buffer overruns in situations where the number of available message buffers is fixed and the rate of generation of log messages being placed into the message buffers cannot be controlled. To avoid possible restrictions imposed by system event logs managed by the operating system of the host computer, embodiments of the present invention employ a separate set of message buffers for storing vendor-specific messages and a separate service application for polling and storing vendor-specific messages.

In one embodiment of the present invention, a vendor-specific buffer pool is loaded with log messages by firmware in an adapter and emptied by a service application within a host computer. The vendor-specific buffer pool is allocated to a device driver associated with the adapter upon system startup, and comprises part of the memory in the host computer. The device driver resides on the host computer, and runs in kernel space (privileged memory space allocated by the host computer's operating system) in the host computer's main memory. The service application periodically polls the device driver for messages. The device driver responds with the number of messages stored in the buffer pool and the total number of buffers in the buffer pool. The service application then issues "get next message" requests to the device driver, which replies by sending the queued messages to the service application. Once the buffer pool has been emptied, the service application writes the messages to a disk file.

The service application then computes a percent utilization of the buffer pool, and if the percent utilization exceeds a predetermined threshold, an algorithm is employed for increasing the polling frequency. If the percent utilization is below the threshold, an algorithm is employed for decreasing the polling frequency. In general, the algorithms cause the polling frequency to rise quickly as buffer utilization increases, but fall slowly as utilization decreases to ensure that buffer overruns do not occur during secondary activity peaks of message bursts.

DETAILED DESCRIPTION OF PREFERRED EMBODIMENTS

Figure 1:
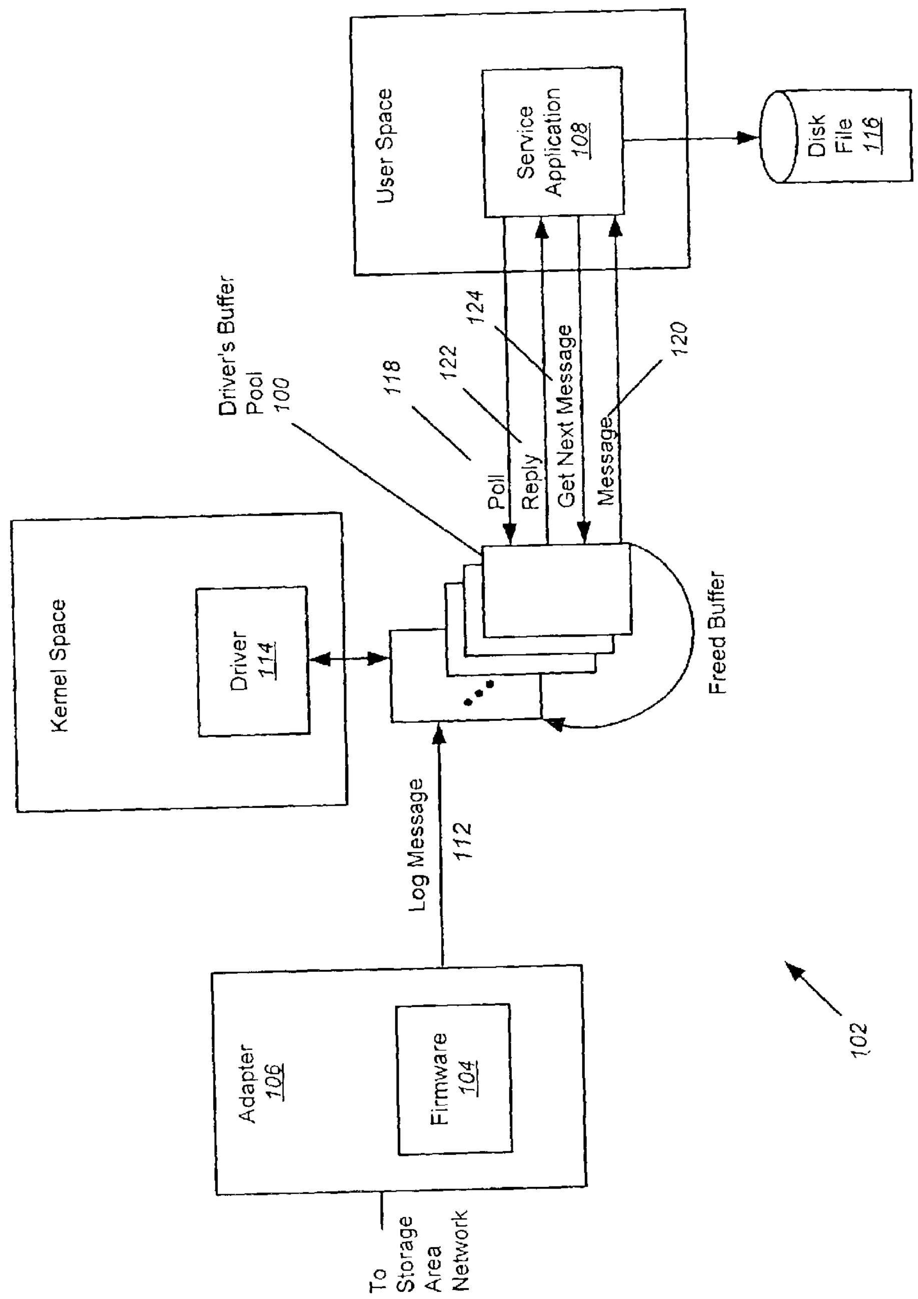
FIG. 1 is an exemplary block diagram illustrating a vendor-specific buffer pool which is loaded by firmware in an adapter and emptied by a service application within a host computer according to embodiments of the present invention.

In the following description of preferred embodiments, reference is made to the accompanying drawings, which form a part hereof, and in which is shown by way of illustration specific embodiments in which the invention may be practiced. It is to be understood that other embodiments may be utilized and structural changes may be made without departing from the scope of the preferred embodiments of the present invention. It should also be noted that although embodiments of the present invention are primarily described herein in terms of logging messages from HBAs to a host computer for purposes of illustration and discussion only, embodiments of the present invention include the logging of messages from other add-on adapters or circuit cards.

Embodiments of the present invention efficiently log messages from a circuit card such as a HBA to a host computer, minimizing the number of messages lost while preserving system bandwidth to the maximum extent possible by avoiding unnecessary polling. In particular, embodiments of the present invention help to prevent the loss of event messages due to message buffer overruns in situations where the number of available message buffers is fixed and the rate of generation of log messages being placed into the message buffers cannot be controlled. To avoid possible restrictions imposed by system event logs managed by the operating system of the host computer, embodiments of the present invention employ a separate set of message buffers for storing vendor-specific messages and a separate service application for polling and storing vendor-specific messages. It should be understood that the vendor-specific event logs utilized by embodiments of the present invention serve a different function and therefore can operate in parallel with operating system event logs such as Microsoft's Windows® System Event Log.

FIG. 1 is an exemplary block diagram illustrating a vendor-specific buffer pool 100 which is loaded by firmware 104 in adapter 106 and emptied by a service application 108 within a host computer 102 according to embodiments of the present invention. In one embodiment, the adapter 106 is a HBA implementing iSCSI. The vendor-specific buffer pool 100 is allocated to a device driver 114 (e.g. a mini-port driver) associated with the adapter 106 upon system startup, and comprises part of the memory in the host computer 102. The device driver 114 resides on the host computer 102, and runs in kernel space 110 (privileged memory space allocated by the host computer's operating system) in the host computer's main memory. The service application 108 periodically polls the vendor-specific buffer pool 100 for messages.

The firmware 104 is designed to generate messages for events that affect the network managed by the adapter 108. For example, a message may be generated if a link to a storage device on the network has gone down or is having problems. Note that such events would not be recognized by Microsoft's system event log, and therefore could not be logged with the host computer using Microsoft's System Event Log.

In general, because the polling system employed by embodiments of the present invention is tailored to adapter cards, the polling system is able to log messages specific to the adapter 106 and is generally able to provide more detail than an operating system's system event log. Messages are generated by the firmware 104 in the adapter 106 when the firmware detects state changes. Detailed messages such as status, debug and error messages or other types of messages are possible, as are a series of messages generated as the firmware attempts to connect to a target. However, not all messages are logged. Log messages 112 are selected by the firmware 104 according to a logging level that is configurable within the firmware 104. In preferred embodiments, log messages 112 are generated when a connection managed by the adapter 106 (e.g. a connection to a storage device) has failed. When the firmware 104 generates a log message 112 (a Log Entry event), it sends a message containing details of the event to the device driver 114 (e.g. a mini-port driver). It should be noted that although firmware is described above, in alternative embodiments the firmware may be replaced by the hardware or software equivalent, referred to generally herein as logic.

The device driver 114 stores this log message 112 in a buffer in a fixed-size buffer pool 100 until the buffer is processed by a service application 108 in user space. The device driver 114 may be automatically installed from the adapter 106 into the host computer 102 by a plug-and-play mechanism in the OS when the system is first powered up. The size of the fixed buffer pool 100 associated with the device driver 114 is also established at system startup. During the initialization sequence for the device driver 114 at system startup, the device driver 114 allocates a fixed number of vendor-specific buffers 100 for temporarily storing log messages 112. Once allocated, the number of vendor-specific buffers 100 reserved for the adapter 106 cannot be increased or decreased. Ideally the number of buffers allocated will be enough to store all of the log messages 112 that may be produced during each polling period. This encourages the allocation of a greater number of buffers to ensure that buffer overrun does not occur. However, because unused buffers represent wasted memory, it is also desirable to keep the number of buffers to a minimum.

Ideally, as log messages 112 temporarily accumulate in the buffer pool 100, the log messages can be transferred to a disk file 116 within or connected to the host computer 116. However, because of operating system restrictions, the device driver 114 cannot notify the service application 108 that a log message 112 has arrived and is being stored in one of the buffers in the buffer pool 100. Instead, the service application 108 must periodically poll the device driver 114 to determine if there are any log messages available. Note that the service application 108 may be installed by an installation program supplied by the vendor of the adapter 106.

Given a fixed number of buffers, in order to minimize the CPU bandwidth used in polling, buffer utilization should approach 100%. That is, polling should occur just often enough that most of the buffers are full each time the buffers are polled. However, the Log Entry events that produce the log messages stored in the buffers do not occur at regular, predictable intervals. In fact, there could be long periods during which no log messages are produced and other periods where a great number of events occur producing a large amount of log messages in a short period of time. Thus it is not possible to determine a single ideal polling period.

As a result, it is up to the service application 108 in user space to poll the device driver 114 frequently enough so that it will not run out of buffers and that the number of buffers in the buffer pool 100 can be kept to a minimum. However, polling is expensive in terms of CPU bandwidth if it is performed too often. Excessive polling can also have a negative impact on the device driver's throughput. It is therefore highly desirable not to poll any more than necessary, and selecting the polling period becomes a balancing act between preventing buffer overrun and wasting CPU and driver bandwidth.

Nevertheless, despite the careful selection of the size of the fixed buffer pool 10, the adapter 106 may, at times, actually generate log messages 112 at a rate faster than the service application 108 can poll and remove messages 120 from the buffer pool 100. Because there are a fixed number of buffers in the buffer pool 100, if this situation should occur, the buffer pool 100 may become completely full, and further log messages 112 will be dropped. Unlike networking systems, which tag incoming messages with a sequence number and can therefore identify and retransmit lost messages, log messages 112 in the system of FIG. 1 that encounter a full buffer pool 100 will be lost.

One solution would be to have the service application 108 poll the buffer pool 100 more often. However, frequent polling consumes CPU horsepower and bandwidth and may unnecessarily degrade system performance due to the nature of the log messages 112. Typically, log messages 104 are configured to be limited to "event" messages, created during catastrophic or leading up to catastrophic events. Thus, the system may operate fine for weeks or months without any log messages 112, and it would be a waste of system resources to have frequent polling 118 when no log messages 112 are being received by the buffer pool 100. However, when something catastrophic does occur, many event messages are typically received, in bursts, over a short period of time.

Thus, embodiments of the present invention dynamically change the rate at which the service application 108 polls the buffer pool 100. In other words, the polling mechanism (service application 108) dynamically self-adjusts its polling frequency in response to system behavior. In particular, embodiments of the present invention dynamically adjust the rate of buffer processing in response to the rate of buffer consumption to reduce the probability of buffer overrun while at the same time preserving memory and lowering processor utilization.

To accomplish this goal, the service application 108 monitors the percent utilization of the buffer pool 100. It does this by examining the number of buffers used by the device driver 114 to store log messages 112 during each polling period, and comparing it to the total number of buffers in the fixed buffer pool 100. If the percent utilization meets or exceeds a predetermined threshold, then the polling frequency is increased. This allows the number of polling operations to be kept to the minimum needed to prevent buffer overruns.

For example, if 50% utilization of the buffer pool is selected as the desired threshold, then when the service application 108 detects that one-half or more of the number of buffers in the buffer pool 100 are filled with a log message 112, the polling frequency is increased. For example, if the buffer pool is comprised of 50 buffers, and in one polling period 25 messages are buffered, the 50% threshold will have been reached and the service application 108 will increase its polling rate (i.e. decrease the time between polls). In a preferred embodiment, the polling rate increase will be 50%, so the next polling period will be two thirds of the current polling period. The next time the buffer pool 100 is polled, the percent utilization of the buffer pool 100 will hopefully have fallen below the 50% threshold. Thus, in this embodiment, an attempt is made to maintain a buffer utilization of approximately 50%. An underlying assumption of this polling algorithm is that when the number of log messages 112 increases, they increase at a relatively constant rate. In other words, in two consecutive polling time periods, roughly the same number of log messages 112 would be sent from the adapter 106 to the buffer pool 100.

The percent utilization of the buffer pool 100 is determined at the time of polling. During a poll 118, the device driver 114 is queried for the number of messages stored in the buffer pool 100. The device driver 114 returns a two-part reply 122 containing the number of log messages 112 being stored by the buffer pool 100 and the total number of buffers in the buffer pool 100. From these answers, the service application 108 can determine how many times it must send a "get next message" command 124 to empty the buffers.

Once the number of messages stored in the buffer pool 100 is known, the service application 108 repeatedly sends "get next message" requests 124 to the device driver 114, which returns messages 120 containing the log messages 112 stored in the buffer pool 100. The service application 108 maintains a count in accordance with the known number of log messages in the buffer pool 100 until all messages have been received. The messages 120 are typically stored in internal buffers(not shown in FIG. 1) when received by the service application 108, and when they are all received, they are written to the disk file 116 in a single disk write command. The single disk write command is faster and requires less CPU involvement than a series of individual writes to the disk file 116.

In one embodiment of the present invention, after the messages 120 are received by the service application 108 and the buffer pool 100 is emptied, the buffer pool's percent utilization is then calculated from the two-part reply 122 received from the device driver 114 in response to a poll 118 from the service application 108. If the percent utilization is at or above the desired threshold, then the next polling period is determined using a formula for increasing the polling rate. If the percent utilization is below the desired threshold, then the next polling period is determined using a formula for decreasing the polling rate. For example, if the target buffer pool percent utilization is 50% and the computed percent utilization is at or above 50%, then the time of the next poll can be calculated using the following formula:

Let:

$B_a$ = the number of buffers available $B_u$ = the number of buffers used during the last polling period $P$ = the desired percentage of buffer utilization $T_c$ = the current polling period length $T_a$ = the adjusted polling period length Then:

$$\frac{B_u}{T_c} = \frac{B_a * P}{T_a} \text{ or } T_a = \frac{B_a * P * T_c}{B_u}$$

Although not shown in the above formula, as a matter of practicality embodiments of the present invention limit the polling period to some predetermined ceiling rate, such as the smallest period easily obtained by user space (non-device driver) code under the Windows operating system.

In between polls, the service application 108 "goes to sleep," and is inactive until the operating system of the host computer 102 invokes the service application 108 at the next polling period. To enter the sleep mode, the service application 108 may issue a call the operating system containing a sleep duration argument. In one embodiment, the sleep duration argument is in whole milliseconds.

It should be understood that the thresholds, algorithms and formula specified above are only exemplary, and that other thresholds, algorithms and formulae could be used and fall within the scope of the invention. For example, the 50% percent utilization threshold and/or the 50% polling rate increase could be different. In one particular example, once a 50% percent buffer pool utilization is reached, the service application may poll at a predetermined maximum polling rate until the percent utilization falls below 50%. In another example, once a received log message is detected, the service application may poll at a predetermined maximum polling rate until the percent utilization falls below 50%. This would be useful for systems characterized by sudden, high levels of message activity. This increase would be made regardless of buffer utilization levels. In another embodiment, each time the buffer utilization is above a set threshold, the polling frequency may be increased by a fixed amount (not a fixed percentage). This could be used in systems where the message activity increased at a steady or predictable rate. The preferred formula depends on the characteristics of message arrivals in the system. In one embodiment of the present invention, a configuration utility may be supplied with the adapter to enable users to specify the types of messages to be logged, the name of the log file, the maximum period between polls, the percent utilization thresholds, the polling change rates, and other parameters.

As described above, event messages tend to occur in multiple bursts followed by long periods of inactivity. Because of this, in preferred embodiments of the present invention, a different algorithm is used to decrease the polling frequency as buffer utilization decreases. Generally, the polling rate is not immediately slowed down once the percent utilization falls below the designated threshold. For example, if the target percent utilization is 50% and the computed percent utilization is below 50%, then in a preferred embodiment, the service application 108 will not slow down the polling rate until it has detected four consecutive polling periods of less than 25% buffer utilization, at which time the polling frequency may be decreased by 10%. If four additional consecutive polling periods of less than 25% buffer utilization are detected, the polling frequency is again decreased by 10%.

Without such a cautious approach to slowing down the polling rate, the service application 108 could encounter a period of inactivity between event bursts and slow down the polling rate, only to discover at the next polling period that another burst of log messages 112 had occurred, resulting in buffer overruns. The algorithm presented above attempts to minimize these buffer overruns by anticipating bursts and maintaining a high polling frequency throughout the bursts.

Again, this algorithm and thresholds are only exemplary, and other algorithms and thresholds may be used within the scope of the present invention. For example, in one embodiment of the present invention, once a set amount of time has passed without any messages being received, the polling rate is set to the minimum frequency (slowest polling rate). The idea behind this approach is to maintain the rate of polling until a period of message inactivity is reached and then instantly reduce the polling frequency in order to preserve CPU and driver bandwidth. This would be useful in systems characterized by message activity that suddenly stops and then has long periods of inactivity (relative to the CPU's view of time). In another embodiment, each time a polling period occurs without any messages being received, the polling frequency is decreased by a set amount until the minimum frequency is reached. Depending on the amount of decrease, the overall decrease rate could be slow or rapid. This would be useful for systems where the message activity tapered off at a fairly fixed rate.

Thus, while the polling frequency rises quickly as buffer utilization increases, it falls slowly as utilization decreases which further helps to insure that buffer overruns do not occur during secondary activity peaks. As with the algorithm for increasing the polling frequency, the algorithm for decreasing the polling frequency also has a predetermined floor below which the polling frequency is not allowed to decrease. This purpose of this floor is to insure that the frequency does not decrease to the point where polling effectively stops. This floor, once set, resides in permanent memory so that it is remembered upon startup.

A step-by-step exemplary overview will now be provided with reference to FIG. 1. When the host computer 102 is first powered up, the device driver 100 in the host computer 102 is initialized. During initialization, a fixed number of buffers comprising a buffer pool 100 are allocated to the device driver (e.g. 36 buffers). In addition, the adapter card 106 and firmware 104 are initialized to indicate which type of events are to be logged (e.g. event messages only).

In the service application 108, the initial polling period and desired percent utilization are set to default and/or preselected values (e.g. 10 ms and 50%, respectively), and the host computer 102 then begins to execute the service application 108. After 10 ms, the service application 108 polls the device driver 114 using message 118, asking for the number of log messages currently being stored in the buffer pool 100, and how many total buffers are in the buffer pool 100. The device driver 114 responds with a reply message 122 containing information on the number of log messages and the total number of buffers (e.g. 18 log messages and 36 buffers.

The service application 108 then transmits a "get next message" request 124 to the device driver 114, and the device driver 114 responds with the next message 120 in the queue of buffers. This process will loop until all messages have been cleared from the buffers. The service application 108 maintains a count in accordance with the known number of log messages in the buffer pool 100 until all messages have been received. The log messages are then written in a single write command to the disk file 116.

After saving the messages to the disk file 116, the service application 108 computes the percent utilization of the buffer pool 100, determines whether the formula for increasing or decreasing the polling rate should be used, and then computes the next polling period using the appropriate formula provided above. In the present example, it computes (36/18×0.5×10 ms), so the next polling period is computed to be 10 ms later. The service application 108 then goes to sleep for 10 ms.

For purposes of illustration, assume that during this sleep period, the buffer pool 100 receives many log messages 112, filling up the buffers until all 36 buffers in the buffer pool 100 are full. At the next polling period, the service application 108 again sends poll 118 to the device driver 114, and the device driver 114 replies at 122, indicating that it has 36 messages and 36 buffers. After repeated "get next message" requests, resulting in the 36 messages being received at the host computer and stored in the disk file, the service application 108 computes the next polling time as (36/36×0.5×10 ms=5 ms), so the next polling period is 5 ms later.

If, within the next 5 ms period, the adapter 106 gets more messages than there are buffers, once the buffers are full then subsequent log messages will be lost.

On the other hand, if, in the next 5 ms period, no log messages 112 were received at the buffer pool 100, then at the next polling period, when the service application 108 polls the device driver 114, the reply will contain an answer of 0 log messages stored, and 36 total buffers in the buffer pool 100. After computing the percent utilization, the service application 108 determines which formula to use. In this case, because there are no messages, the service application 108 uses the formula for decreasing the polling rate described above. Because this is the first polling period in which the percent utilization is <25%, the polling rate is not changed. The system service maintains a count indicating that this is the first polling period with a buffer percent utilization of under 25%. However, if this happens for four consecutive polling periods, then after the fourth polling period, the polling rate will be decreased by 10%.

In one embodiment of the present invention, once the polling rate is decreased by 10%, it will not decrease again until four more consecutive polling periods have elapsed, each with a buffer percent utilization of less than 25%. In another embodiment, the count of consecutive periods under 25% utilization is not reset when the polling rate is decreased by 10%, so if the next polling period still has a percent utilization of under 25%, the polling rate is again decreased by 10%.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A system for storing selected vendor-specific messages generated in an adapter card coupled to a host computer into a disk file controlled by the host computer, comprising:

logic resident on the adapter card for generating the vendor-specific messages and selecting certain types of the vendor-specific messages for logging;

a fixed-size buffer pool in the host computer for receiving and storing the selected vendor-specific messages; and at least one processor in the host computer programmed for executing a service application in user space in the host computer to periodically poll the buffer pool, retrieve the selected vendor-specific messages from the buffer pool, store the selected vendor-specific messages in the disk file, increase a polling frequency of the buffer pool according to a first methodology if buffer pool utilization is at or above a first predetermined threshold, and decrease the polling frequency of the buffer pool according to a second methodology if the buffer pool utilization is below a second predetermined threshold for a predetermined number of consecutive polling periods to account for multiple bursts of vendor-specific messages occurring within a period of vendor-specific message inactivity.

2. The system as recited in claim 1, the at least one processor further programmed for executing a device driver in kernel space for managing the storing and retrieval of the messages from the buffer pool.

3. The system as recited in claim 2, the at least one processor further programmed for allocating the fixed-sized buffer pool upon initialization of the device driver.

4. The system as recited in claim 2, wherein in response to a poll from the service application in user space, the at least one processor is further programmed for generating a reply to the service application containing a number of messages in the buffer pool and a total number of buffers in the buffer pool.

5. The system as recited in claim 4, the at least one processor further programmed in accordance with the service application for issuing one "get next messages" request to the device driver for each message in the buffer pool, and further programmed in accordance with the device driver to transmit and remove one message from the buffer pool for each "get next message" request received at the device driver.

6. The system as recited in claim 5, the at least one processor further programmed for storing all messages into the disk file once all messages have been received in user space.

7. The system as recited in claim 4, the at least one processor further programmed for computing the buffer pool utilization by dividing the number of messages in the buffer pool by the total number of buffers in the buffer pool.

8. The system as recited in claim 1, the logic for selecting the vendor-specific messages in accordance with a configurable logging level.

9. The system as recited in claim 1, wherein the adapter card is a host bus adapter (HBA) for managing a transfer of information between the host computer and a storage area network.

10. The system as recited in claim 9, wherein the HBA manages the transfer of information between the host computer and an iSCSI-compatible storage area network.

11. A storage area network (SAN) comprising the system of claim 10, wherein an iSCSI network is coupled to the HBA and one or more storage devices are coupled to the iSCSI network.

12. The system as recited in claim 9, wherein the HBA manages the transfer of information between the host computer and fibre channel-compatible storage area network.

13. A storage area network (SAN) comprising the system of claim 12, wherein a fibre channel network is coupled to the HBA and one or more storage devices are coupled to the fibre channel network.

14. The system as recited in claim 1, the first methodology for increasing a polling frequency of the buffer pool to a predetermined maximum polling rate if the buffer pool utilization is at or above the first predetermined threshold, and maintaining this maximum polling rate until the buffer pool utilization falls below the first predetermined threshold.

15. The system as recited in claim 1, the second methodology for decreasing a polling frequency of the buffer pool to a predetermined minimum polling rate if a predetermined amount of time has passed without any vendor-specific messages being stored into the fixed-size buffer pool.

16. In a system for temporarily storing selected vendor-specific messages into a fixed-size buffer pool and periodically polling the buffer pool to empty the buffer pool and transfer the selected vendor-specific messages to a disk file controlled by a host computer, an adapter for assisting in storing the selected vendor-specific messages into the buffer pool and transferring them to the disk file, comprising:

logic for generating the vendor-specific messages and selecting certain types of the vendor-specific messages for logging in accordance with a configurable logging level; and a device driver installable into kernel space in the host computer for allocating the fixed-size buffer pool in the host computer upon initialization of the device driver and for managing a storing and retrieval of the messages into the buffer pool.

17. The adapter as recited in claim 16, the device driver for generating a reply to a service application containing a number of messages in the buffer pool and a total number of buffers in the buffer pool in response to a pool from the service application.

18. The adapter as recited in claim 17, the device driver for transmitting and removing one message from the buffer pool for each "get next message" request received at the device driver.

19. The adapter as recited in claim 16, wherein the adapter is a host bus adapter (HBA) for managing a transfer of information between the host computer and a storage area network.

20. The adapter as recited in claim 19, wherein the HBA manages the transfer of information between the host computer and an iSCSI-compatible storage area network.

21. A storage area network (SAN) comprising the adapter of claim 20, wherein an iSCSI network is coupled to the HBA and one or more storage devices are coupled to the iSCSI network.

22. The adapter as recited in claim 19, wherein the HBA manages the transfer of information between the host computer and fibre channel-compatible storage area network.

23. A storage area network (SAN) comprising the adapter of claim 22, wherein a fibre channel network is coupled to the HBA and one or more storage devices are coupled to the fibre channel network.

24. A method for storing selected vendor-specific adapter card messages into a disk file controlled by a host computer, comprising:

allocating a fixed-size buffer pool in the host computer for receiving and storing the selected vendor-specific messages;

periodically polling the buffer pool retrieve and remove the selected vendor-specific messages from the buffer pool and store the selected vendor-specific messages in the disk file;

increasing a polling frequency of the buffer pool according to a first methodology if buffer pool utilization is at or above a first predetermined threshold; and decreasing the polling frequency of the buffer pool according to a second methodology if the buffer pool utilization is below a second predetermined threshold for a predetermined number of consecutive polling periods to account for multiple bursts of vendor-specific messages occurring within a period of vendor-specific message inactivity.

25. The method as recited in claim 24, further comprising executing a device driver in kernel space for managing the storing and retrieval of the messages from the buffer pool.

26. The method as recited in claim 25, further comprising allocating the fixed-sized buffer pool upon initialization of the device driver.

27. The method as recited in claim 25, wherein in response to a poll from a service application in user space, the method further comprises generating a reply to the service application containing a number of messages in the buffer pool and a total number of buffers in the buffer pool.

28. The method as recited in claim 27, the method further comprising issuing one "get next message" request from the service application to the device driver for each message in the buffer pool, and transmitting one message from the buffer pool to the service application and removing one message from the buffer pool for each "get next message" request received at the device driver.

29. The method as recited in claim 28, further comprising storing all messages into the disk file once all messages have been received in user space.

30. The method as recited in claim 27, further comprising computing the buffer pool utilization by dividing the number of messages in the buffer pool by the total number of buffers in the buffer pool.

31. A host computer for periodically polling selected vendor-specific messages stored into a fixed-size buffer pool to empty the buffer pool and transfer the selected vendor-specific messages to a disk file, comprising:

a fixed-size buffer pool for receiving and storing the selected vendor-specific messages;

a device driver installable into kernel space in the host computer for allocating the fixed-size buffer pool upon initialization of the device driver and for managing a storing and retrieval of the messages into the buffer pool; and at least one processor in the host computer programmed for executing a service application in user space in the host computer to periodically poll the buffer pool, retrieve the selected vendor-specific messages from the buffer pool, store the selected vendor-specific messages in the disk file, increase a polling frequency of the buffer pool according to a first methodology if buffer pool utilization is at or above a first predetermined threshold, and decrease the polling frequency of the buffer pool according to a second methodology if the buffer pool utilization is below a second predetermined threshold for a predetermined number of consecutive polling periods to account for multiple bursts of vendor-specific messages occurring within a period of vendor-specific message inactivity.

32. The host computer as recited in claim 31, the first methodology for increasing a polling frequency of the buffer pool to a predetermined maximum polling rate if the buffer pool utilization is at or above the first predetermined threshold, and maintaining this maximum polling rate until the buffer pool utilization falls below the first predetermined threshold.

33. The computer as recited in claim 31, the second methodology for decreasing a polling frequency of the buffer pool to a predetermined minimum polling rate if a predetermined amount of time has passed without any vendor-specific messages being stored into the fixed-size buffer pool.

34. The host computer as recited in claim 31, the device driver for generating a reply to the service application containing a number of messages in the buffer pool and a total number of buffers in the buffer pool in response to a poll from the service application.

35. The host computer as recited in claim 34, the service application for computing the buffer pool utilization by dividing the number of messages in the buffer pool by the total number of buffers in the buffer pool.

36. The host computer as recited in claim 31, the service application for issuing one "get next message" request to the device driver for each message in the buffer pool, and the device driver for transmitting and removing one message from the buffer pool for each "get next message" request received at the device driver.

37. The host computer as recited in claim 36, the service application for storing all messages into the disk file once all messages have been received in user space.

38. A storage area network (SAN) comprising the host computer of claim 31, wherein an iSCSI network is coupled to the host computer and one or more storage devices are coupled to the iSCSI network.

39. A storage area network (SAN) comprising the host computer of claim 31, wherein a fibre channel network is coupled to the host computer and one or more storage devices are coupled to the fibre channel network.

* * * * *